(12) United States Patent
Couch et al.

(10) Patent No.: US 6,773,840 B2
(45) Date of Patent: Aug. 10, 2004

(54) CONFIGURATION ENABLING RAPID FUEL CELL POWER FROM SUB-FREEZING INITIAL CONDITION

(75) Inventors: Harold T. Couch, Simsbury, CT (US); Frederick Sribnik, Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 114 days.

(21) Appl. No.: 10/057,233

(22) Filed: Jan. 25, 2002

(65) Prior Publication Data

US 2003/0143439 A1 Jul. 31, 2003

(51) Int. Cl.[7] .............................................. H01M 8/04
(52) U.S. Cl. ........................... 429/26; 429/24; 429/13
(58) Field of Search ............................. 429/26, 24, 13

(56) References Cited

U.S. PATENT DOCUMENTS

| | | | |
|---|---|---|---|
| 3,664,873 A | | 5/1972 | Buswell et al. |
| 6,063,515 A | | 5/2000 | Epp et al. |
| 2001/0019789 A1 | | 9/2001 | Hirakata |
| 2002/0009648 A1 | | 1/2002 | Buchner et al. |
| 2002/0040896 A1 | * | 4/2002 | Ap .............................. 219/208 |

FOREIGN PATENT DOCUMENTS

WO    WO 200017951 A1  *  3/2000   ............ H01M/8/04

\* cited by examiner

*Primary Examiner*—Carol Chaney
(74) *Attorney, Agent, or Firm*—Bachman & LaPointe, P.C.

(57) ABSTRACT

A start system for enabling rapid fuel cell power from sub-freezing initial conditions in a fuel cell power plant which comprises heating an antifreeze coolant source and melting ice in the sump of a cell stack assembly with the heated antifreeze to effect start up.

24 Claims, 1 Drawing Sheet

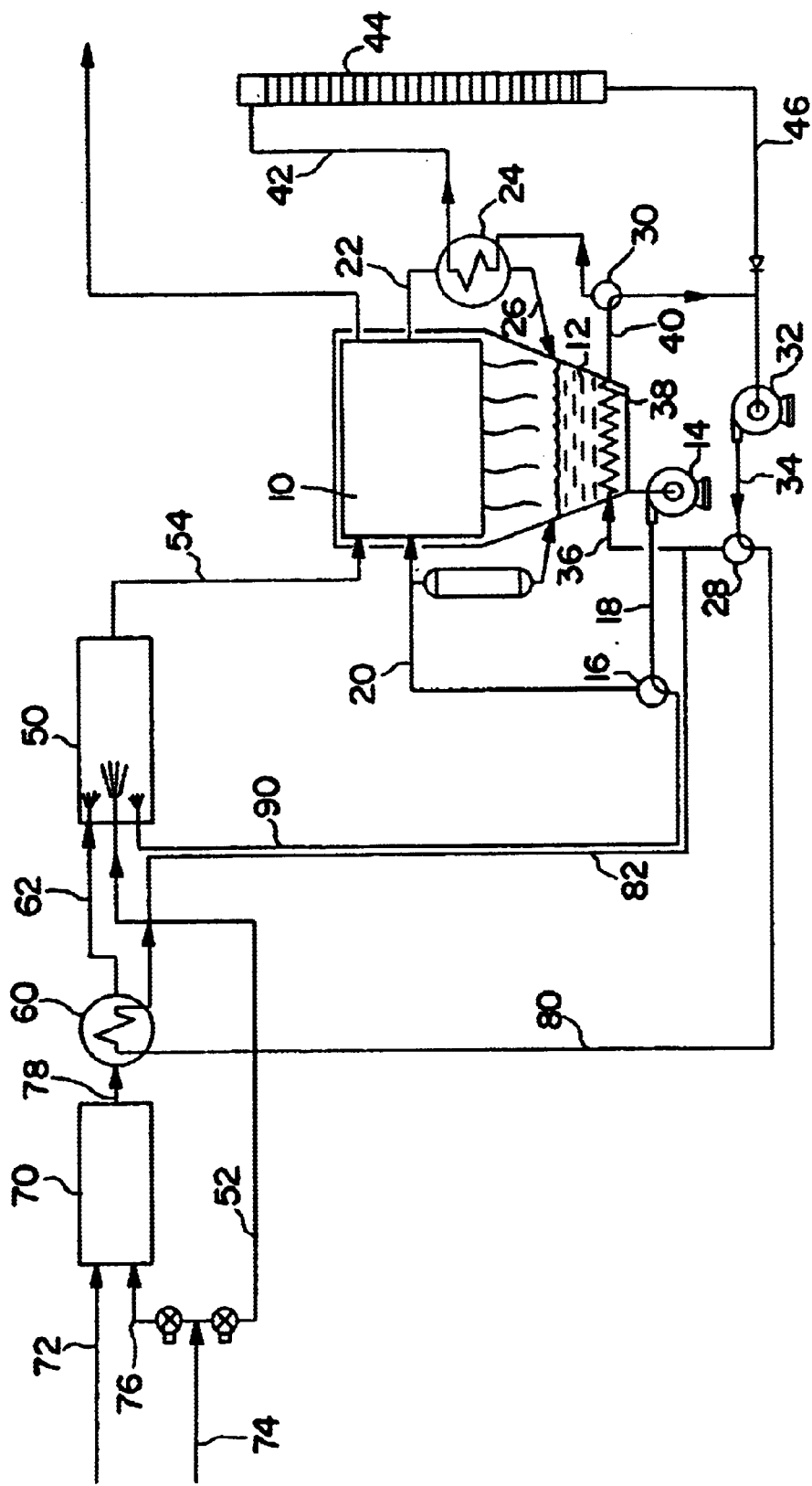

CONFIGURATION ENABLING RAPID FUEL CELL POWER FROM SUB-FREEZING INITIAL CONDITION

BACKGROUND OF THE INVENTION

Fuel cell power plants are well known in the art and are commonly used to produce electrical energy from reducing and oxidizing fluids. Such fuel cell power plants include a cell stack assembly which, in addition to electricity, produces waste heat and product water that require a water management and coolant system. While not in operation, the power plant may be subject to freezing conditions that can cause water in the stack to become frozen. When this occurs starting up the power plant is a more difficult task especially when the power plant is required to started up in a short period of time.

Accordingly, it is the principle object of the present invention to provide an apparatus and method for enabling rapid start up of a fuel cell power from sub-freezing initial conditions.

SUMMARY OF THE PRESENT INVENTION

The foregoing object is achieved by providing an apparatus and method that includes heating antifreeze in a coolant loop, melting ice in the fuel cell stack sump with the heated antifreeze, using the melted ice as a water source for making steam in a flash vaporizer and feeding a stream containing the steam into the cold cell stack assembly to effect a startup.

BRIEF DESCRIPTION OF THE DRAWING

The FIGURE is a schematic representation of a quick start system for enabling rapid fuel cell power according to the present invention.

DETAILED DESCRIPTION

The present invention will be described with reference to the FIGURE that illustrates a system configuration in accordance with the present invention. Cell stack assembly 10 includes a sump 12 for collecting coolant water that, in normal operating conditions, is circulated through the cell stack assembly in a closed loop by pump 14.

As illustrated in the FIGURE, 3-way valve 16 is shown in the position for initial start-up. When operated in normal conditions, the 3-way valve 16 is positioned so that water is circulated by pump 14 from the sump 12 through line 18, 3-way valve 16 and line 20 to cool the cell stack assembly 10. The water is then returned to the pump 12 from the cell stack assembly 10 via line 22, heat exchanger 24 and line 26 thus forming a closed loop.

When operated in normal conditions, the 3-way valves 28 and 30 are positioned so that the antifreeze coolant is circulated by pump 32 through lines 34, valve 28, and line 36 into sump heat exchanger 38, which provides some cooling of the sump water 12, of the cell stack assembly 10. The antifreeze coolant from sump hex 38 flows through line 40, then valve 30 to main heat exchanger 24 where it cools the cell stack water coolant also flowing through the main heat exchanger 24. The antifreeze coolant then flows via line 42 through radiator 44, giving up waste heat from the power plant, to pump 32 by line 46 thus forming a closed loop.

The primary components of the start up system are: 1) catalytic combustor 70, 2) heat exchanger 60 and 3) flash vaporizer 50. These elements act to preheat the incoming cell stack air stream, melt any ice in the cell stack sump 12, add steam to the air stream, and provide the air/steam stream to the stack so a rapid start can be obtained.

In the FIGURE, 3-way valves 28 and 30 are illustrated in the start-up position which allows, antifreeze coolant to pass through heat exchanger 60 and the cell stack sump 12.

The catalytic combustor 70 functions in a manner known in the art. The combustor 70 receives air through line 72 and fuel from line 76, combusts the mixture and feeds the heated combustion product stream through line 78 to the heat exchanger 60 where heat is transferred to the antifreeze stream. While hydrogen is the preferred fuel, other suitable fuels include hydrocarbon fuels such as natural gas. The combustion product stream exhaust from heat exchanger 60 is fed via line 62 to flash vaporizer 50. The flash vaporizer 50 is also fed with fuel from line 52 and water from line 90. The air/steam product from the flash vaporizer is fed by line 54 to the cell stack assembly 10 as a source of energy to bring the cell stack assembly up to operating temperature.

The start up system further includes an antifreeze coolant line 80 for feeding antifreeze coolant from pump 32, when 3-way valve 28 is positioned to direct antifreeze to the heat exchanger 60. As previously noted, the antifreeze coolant is heated by the combustion product stream from catalytic combustor 70 that is fed through line 78 to heat exchanger 60. The heated antifreeze coolant is then fed via line 82 and line 36 to sump heat exchanger 38 in sump 12 where the heated antifreeze coolant melts ice in the sump 12. The antifreeze coolant is recycled to pump 32 by line 40 and valve 30, which is positioned as shown in the FIGURE for quick start up.

As noted above, the start up system includes water line 90 for feeding water, resulting from the ice melting, through valve 16 (as illustrated) to the flash vaporizer 50. The water from line 90 may be heated by antifreeze flowing through line 82 if desired. Fuel from line 52 is also fed to vaporizer 50. The air/steam product gas from the vaporizer is then fed via line 54 to the cell stack assembly 10 in order to bring it up to an initial operating temperature.

The system configuration enables abundant steam generation from the combustion-fed flash vaporizer. The flash vaporizer 50 is fed with water from the initially melted fraction of frozen water in the cell stack assembly sump 12. This occurs quickly since only the heat of fusion need be input to the frozen water reservoir in the sump to render the system functional. (the heat of vaporization is input in the flash vaporizer 50). The foregoing avoids contamination of a cell stack water coolant system. It is expected that the system will enable a correspondingly quick (~1 minute) fuel-cell system start.

The flow of antifreeze during a cold-start is routed to heat exchanger 60, by the setting of 3-way valves 28 and 30 as shown in the FIGURE where it bypasses the main radiator 44. In the case where hydrogen is used as the fuel, the flow of hydrogen to the first stage of the catalytic combustor (the catalytic combustor 30 in the FIGURE) is limited to about 4–6 SCFM as is consistent with an air temperature of ~200–300° C. into heat exchanger 60. The inlet air-temperature limit is a practical necessity so the antifreeze fluid is not flashed or otherwise degraded by the heating. A higher temperature may be permissible or a lower temperature more expedient depending upon antifreeze composition, flow rate and the characteristics of heat exchanger 60. The heat exchanger 60 raises the temperature of antifreeze to 100–175° C. enabling a quick thaw of the incoming water lines. It also melts a portion of the ice (for a sub-zero start) contained in the sump 12 below the CSA 10 in the Figure.

The second stage of catalytic combustion in the flash vaporizer 50 may require a greater fuel flow in order to flash vaporizer up to about 200 Kg/Hr of water for a 50 to 100 KW power plant. A temperature limit of 100–125° C. for the hot air/steam effluent from the flash vaporizer may be necessary to avoid any damage to the CSA 10 caused by thermal stresses. Thus, the fuel flow to the second stage of catalytic combustion must be regulated such that no liquid condensate is allowed to accumulate in the vaporizer as a low temperature criterion and that the temperature not be so high as to jeopardize the CSA structure as the high-end criterion.

Once the system has reached the appropriate temperature the antifreeze flow to the heat exchanger 60 is stopped by repositioning 3-way valves 28 and 30 to redirect the flow of antifreeze fluid to the main radiator 44 via main heat exchange element 24. During normal operation heat transfer from the water to the antifreeze coolant occurs from both the sump heat exchanger 38 and from the main heat exchanger 24.

The system configuration employs a suitable antifreeze coolant such as ethylene glycol both to thaw and heat a frozen cell-stack during a start-up from a subzero temperature and to cool the cell-stack during normal operation. With this system configuration, a 50–100 KW power plant one needs only about 4 lbs. of water (0.5 gallons) thawed over the course of approximately 30 seconds in order to generate 147 SCFM of steam.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A quick start system for enabling rapid fuel cell power from sub-freezing initial conditions comprising:
   a cell stack assembly having a sump containing water;
   a heat exchanger;
   first feed means for feeding a heat source to the heat exchanger;
   a source of antifreeze coolant; and
   second feed means for feeding antifreeze coolant to the heat exchanger for heating same and passing the heated antifreeze coolant to the sump for heating the water in the sump.

2. A system according to claim 1 wherein the heat source comprises a catalytic combustor for combusting a mixture of fuel and air to produce a hot gas which passes to the heat exchanger.

3. A system according to claim 2 further comprising a flash vaporizer downstream of the heat exchanger and upstream of the cell stack assembly for receiving the hot gas.

4. A system according to claim 3 including third feed means for feeding water from the sump, in heat exchange relationship with the heated antifreeze coolant, to the flash vaporizer.

5. A system according to claim 1 wherein the second feed means includes valve means for bypassing the heat exchanger wherein the antifreeze coolant is fed to the sump.

6. A system according to claim 4 wherein the second feed means includes valve means for bypassing the heat exchanger wherein the antifreeze coolant is fed to the sump.

7. A system according to claim 6 wherein the third feed means includes valve means for bypassing the flash vaporizer wherein the water from the sump is fed to the cell stack assembly.

8. A system according to claim 4 including fourth feed means for feeding a fuel to the flash vaporizer.

9. A system according to claim 8 wherein the flash vaporizer communicates with the cell stack assembly.

10. A system according to claim 4 wherein the antifreeze coolant is contained in a closed loop.

11. A system according to claim 2 wherein the fuel is $H_2$.

12. A system according to claim 8 wherein the fuel is $H_2$.

13. A method for providing a quick start for a fuel cell from sub-freezing initial conditions, comprising the steps of:
    providing a cell stack assembly having a sump containing ice;
    providing a heat exchanger;
    feeding a source of heat to the heat exchanger;
    feeding a source of antifreeze coolant to the heat exchanger for heating same;
    feeding the heated antifreeze coolant to the sump for melting a portion of the ice to water; and
    passing the water from the sump to a flash vaporizer where it is mixed with a fuel and a combustion product from a catalytic combustor and vaporized to provide a hot air and steam feed for the cell stack assembly start up.

14. A method according to claim 13 wherein the fuel is $H_2$.

15. A method according to claim 13 wherein the combustion product of the catalytic combustor is the source of heat for the heat exchanger.

16. A method according to claim 13 wherein the antifreeze coolant is heated to a temperature of between 100 to 175° C.

17. A method according to claim 13 wherein the hot air/steam feed is heated to a temperature of between 100 to 125° C.

18. A method according to claim 13 wherein the water passing from the sump to the flash vaporizer is heated indirectly by the heated antifreeze coolant passing from the heat exchanger to the sump.

19. A method according to claim 13 further including the step of, after start up, bypassing the heat exchange with the antifreeze coolant and feeding the antifreeze coolant through the sump and to a radiator.

20. A method according to claim 13 wherein the antifreeze coolant is in a closed loop.

21. A method according to claim 19 wherein the antifreeze coolant is in a closed loop.

22. A method according to claim 13 wherein the source of heat is at a temperature of $\leq 300°$ C.

23. A system according to claim 1, wherein the anti-freeze coolant is fed through an anti-freeze coolant circuit which is not in fluid communication with the water.

24. A system according to claim 23, wherein the anti-freeze coolant circuit is in heat exchange relationship with the sump whereby the heated anti-freeze melts ice in the sump.

* * * * *